(12) United States Patent
Park et al.

(10) Patent No.: US 8,937,462 B2
(45) Date of Patent: Jan. 20, 2015

(54) OVERVOLTAGE REPETITION PREVENTION CIRCUIT, METHOD THEREOF, AND POWER FACTOR COMPENSATION CIRCUIT USING THE SAME

(75) Inventors: Young Bae Park, Anyang (KR); Hyun Min Kim, Bucheon (KR); Ho Jae Lee, Seoul (KR)

(73) Assignee: Fairchild Korea Semiconductor Ltd., Bucheon (KR)

( * ) Notice: Subject to any disclaimer, the term of this patent is extended or adjusted under 35 U.S.C. 154(b) by 322 days.

(21) Appl. No.: 13/440,787

(22) Filed: Apr. 5, 2012

(65) Prior Publication Data
US 2012/0262132 A1 Oct. 18, 2012

(30) Foreign Application Priority Data

Apr. 13, 2011 (KR) .................. 10-2011-0034391

(51) Int. Cl.
| | |
|---|---|
| G06F 5/00 | (2006.01) |
| G06F 1/10 | (2006.01) |
| G05B 13/02 | (2006.01) |
| H02M 1/42 | (2007.01) |

(52) U.S. Cl.
CPC .. *G06F 1/10* (2013.01); *G06F 1/70* (2013.01); *G05B 13/02* (2013.01); *H02M 1/42* (2013.01); *H02M 1/4225* (2013.01); *Y02B 70/126* (2013.01)
USPC ........................................................ 323/207

(58) Field of Classification Search
USPC ................. 323/205, 207, 222, 282, 284, 285; 361/18, 91.1
See application file for complete search history.

(56) References Cited

U.S. PATENT DOCUMENTS

| | | | |
|---|---|---|---|
| 4,872,104 A | 10/1989 | Holsinger | |
| 2011/0109281 A1* | 5/2011 | Yabuzaki et al. | ............. 323/210 |
| 2011/0110127 A1* | 5/2011 | Lee | ................................. 363/44 |

* cited by examiner

*Primary Examiner* — Adolf Berhane
*Assistant Examiner* — Afework Demisse
(74) *Attorney, Agent, or Firm* — Okamoto & Benedicto LLP

(57) ABSTRACT

The present invention relates to an overvoltage repetition prevention circuit, a method thereof, and a power factor correction circuit including the same. The power factor correction circuit includes: an inductor receiving an input voltage and supplying an output voltage; a power switch connected to the inductor and controlling an inductor current to the inductor; and a power factor correction controller differently controlling a control structure generating a control voltage controlling a switching operation of the power switch during a predetermined overvoltage stabilization period generated in synchronization with a time that an output voltage is an overvoltage and the control structure generating the control voltage in a normal state in which the output voltage is not the overvoltage, wherein the control structure is determined according to a difference between the output voltage and a predetermined output target voltage during the overvoltage stabilization period.

14 Claims, 3 Drawing Sheets

US 8,937,462 B2

OVERVOLTAGE REPETITION PREVENTION CIRCUIT, METHOD THEREOF, AND POWER FACTOR COMPENSATION CIRCUIT USING THE SAME

CROSS-REFERENCE TO RELATED APPLICATION

This application claims priority to and the benefit of Korean Patent Application No. 10-2011-0034391 filed in the Korean Intellectual Property Office on Apr. 13, 2011, the entire contents of which are incorporated herein by reference.

BACKGROUND OF THE INVENTION (a) Field

Embodiments relate to a circuit for preventing repetition of an overvoltage and a method thereof. Also, Embodiments relates to a power factor correction circuit using an overvoltage repetition prevention circuit and a method thereof.

(b) Description of the Related Art

In a system in which a control response for a change of an output voltage is slow, the output voltage may be increased to an overvoltage. As one example of the system in which the control response is slow, there is a power factor correction circuit.

In a normal state in which the output voltage of the power factor correction circuit is controlled to be constantly maintained, when the input voltage of the power factor correction circuit is increased or a load connected to the power factor correction circuit is decreased, the output voltage may be increased to the overvoltage.

The power factor correction circuit receives a feedback voltage corresponding to the output voltage and controls the output voltage according to the feedback voltage to control the output voltage to be constant. Here, a fluctuation generated to an AC line connected to an input terminal of the power factor correction circuit must be reflected to the output voltage.

The output voltage must be constantly generated and the input current of the power factor correction circuit must be controlled to follow the sine wave for the power factor correction. Generally, for this, it is set up that a control loop speed of the power factor correction circuit is slow.

If the overvoltage is generated, a switching operation of the power factor correction circuit is stopped and the stop state of the switching operation is maintained until the output voltage is decreased to a predetermined threshold voltage (an overvoltage determination reference voltage). This is referred to as an overvoltage protection operation.

Although the output voltage is less than the threshold voltage and then the switching operation is again started, the feedback voltage determined according to the level of the output voltage enters a high state by the slow speed of the control loop. Accordingly, the overvoltage may again be repeatedly generated. Thus, the overvoltage protection operation may be repeatedly generated.

As described above, if the overvoltage is repeatedly generated such that the overvoltage protection operation is triggered, the overvoltage protection operation is repeatedly generated.

The above information disclosed in this Background section is only for enhancement of understanding of the background of the invention and therefore it may contain information that does not form the prior art that is already known in this country to a person of ordinary skill in the art.

SUMMARY OF THE INVENTION

Embodiments provide an overvoltage repetition prevention circuit for preventing an overvoltage of an output voltage and a repetition of an overvoltage protection operation, a method thereof, and a power factor correction circuit using the same.

A power factor correction circuit of according to an embodiment includes: an inductor receiving an input voltage and supplying an inductor current; a power switch connected to the inductor and controlling the inductor current; and a power factor correction controller differently controlling a control structure generating a control voltage for controlling a switching operation of a the power switch according to: during a predetermined overvoltage stabilization period generated in synchronization with a time that an output voltage becomes an overvoltage and during a normal state in which the output voltage is not the overvoltage, wherein the control structure is determined according to a difference between the output voltage and a predetermined output target voltage during the overvoltage stabilization period.

The power factor correction controller generates the control voltage to be proportional to an output voltage error that is a difference between the divided voltage corresponding to the output voltage during the overvoltage stabilization period and an output reference voltage corresponding to the output target voltage that is a target voltage of the output voltage.

In the normal state, the power factor correction circuit is a proportional-integral structure generating the control voltage according to a result that the output voltage error is integrated.

The power factor correction controller includes a control voltage generator generating the control voltage according to the output voltage error, and a capacitor connected to the output terminal of the control voltage generator and compensating a frequency component of the control voltage.

The control voltage generator includes an error amplifier amplifying a difference between the divided voltage and the output reference voltage to generate the output voltage error, and an overvoltage repetition prevention circuit generating the control voltage determined by an error voltage corresponding to the output voltage error during the overvoltage stabilization period, wherein the overvoltage repetition prevention circuit is triggered if the overvoltage is generated.

The overvoltage repetition prevention circuit includes a current detector sensing an output voltage error to generate a detection current corresponding to the output voltage error; a current mirror circuit copying the detection current with a predetermined ratio to generate a copy current; an I/V convertor converting the copy current into a voltage to generate the error voltage; a control voltage controller connected to the output terminal of the control voltage generator during the overvoltage stabilization period to control the control voltage as a value following the error voltage; a control switch connected between the output terminal of the control voltage generator and the control voltage controller; and a counter triggered by the overvoltage protection signal generated if the overvoltage is generated such that the control switch is turned-on during the overvoltage stabilization period.

The power factor correction circuit of may further include an assistance inductor coupled to the inductor in a predetermined turn ratio, and the power factor correction controller determines a turn-on time of the power switch according to an assistance voltage as the voltage of both terminals of the assistance inductor and determines a turn-off time of the power switch according to a result comparing the control voltage with a ramp signal having a predetermined cycle.

When the control voltage is generated according to the proportional control structure during a predetermined first period so that the generation of the overvoltage is prevented after the overvoltage is generated corresponding to a change of a load connected to the power factor correction circuit or a change of the input voltage of the power factor correction circuit, the overvoltage stabilization period is set up as at least the first period.

An overvoltage repetition prevention circuit according to another embodiment may prevent the phenomenon in which an output voltage of a circuit including a capacitor supplied with a control voltage controlling the switching operation of the power switch becomes the overvoltage.

The overvoltage repetition prevention circuit includes: an I/V converter generating an error voltage following an output voltage error that is a difference between the divided voltage corresponding to the output voltage during a predetermined overvoltage stabilization period and an output reference voltage corresponding to the output target voltage that is a target voltage of the output voltage; and a control voltage controller controlling the control voltage as a value following the error voltage according to a proportional control structure during the overvoltage stabilization period.

The overvoltage repetition prevention circuit further includes: a control switch connected between one terminal of a capacitor applied with the control voltage and the control voltage controller; and a counter triggered by the overvoltage protection signal generated if the overvoltage is generated to turn on the control switch during the overvoltage stabilization period.

The overvoltage repetition prevention circuit further includes: a current detector sensing the output voltage error to generate a detection current corresponding to the output voltage error; and a current mirror circuit copying the detection current with a predetermined ratio to generate a copy current, and the I/V convertor converts the copy current into the voltage to generate the error voltage.

After the overvoltage is generated corresponding to a change of a load connected to the circuit or a change of an input voltage of the circuit, the control voltage is generated according to the proportional control structure during the predetermined first period such that the overvoltage is not generated, and the overvoltage stabilization period is set up as at least the first period.

An overvoltage repetition prevention method according to yet another embodiment may prevent a repetition of an overvoltage of an output voltage of a circuit including a capacitor supplied with a control voltage controlling a switching operation of a power switch.

The overvoltage repetition prevention method includes: generating an error voltage following an output voltage error that is a difference between the divided voltage corresponding to the output voltage during a predetermined overvoltage stabilization period and an output reference voltage corresponding to the output target voltage that is a target voltage of the output voltage; and controlling the control voltage as a value following the error voltage according to a proportional control structure during the overvoltage stabilization period.

After the overvoltage is generated corresponding to a change of a load connected to the circuit or a change of an input voltage of the circuit, the control voltage is generated according to the proportional control structure during the predetermined first period such that the overvoltage is not generated, the overvoltage stabilization period is set up as at least the first period.

The present invention provides an overvoltage repetition prevention circuit for preventing an overvoltage of an output voltage and a repetition of an overvoltage protection operation, a method thereof, and a power factor circuit using the same.

DETAILED DESCRIPTION OF THE EMBODIMENTS

Figure 1:
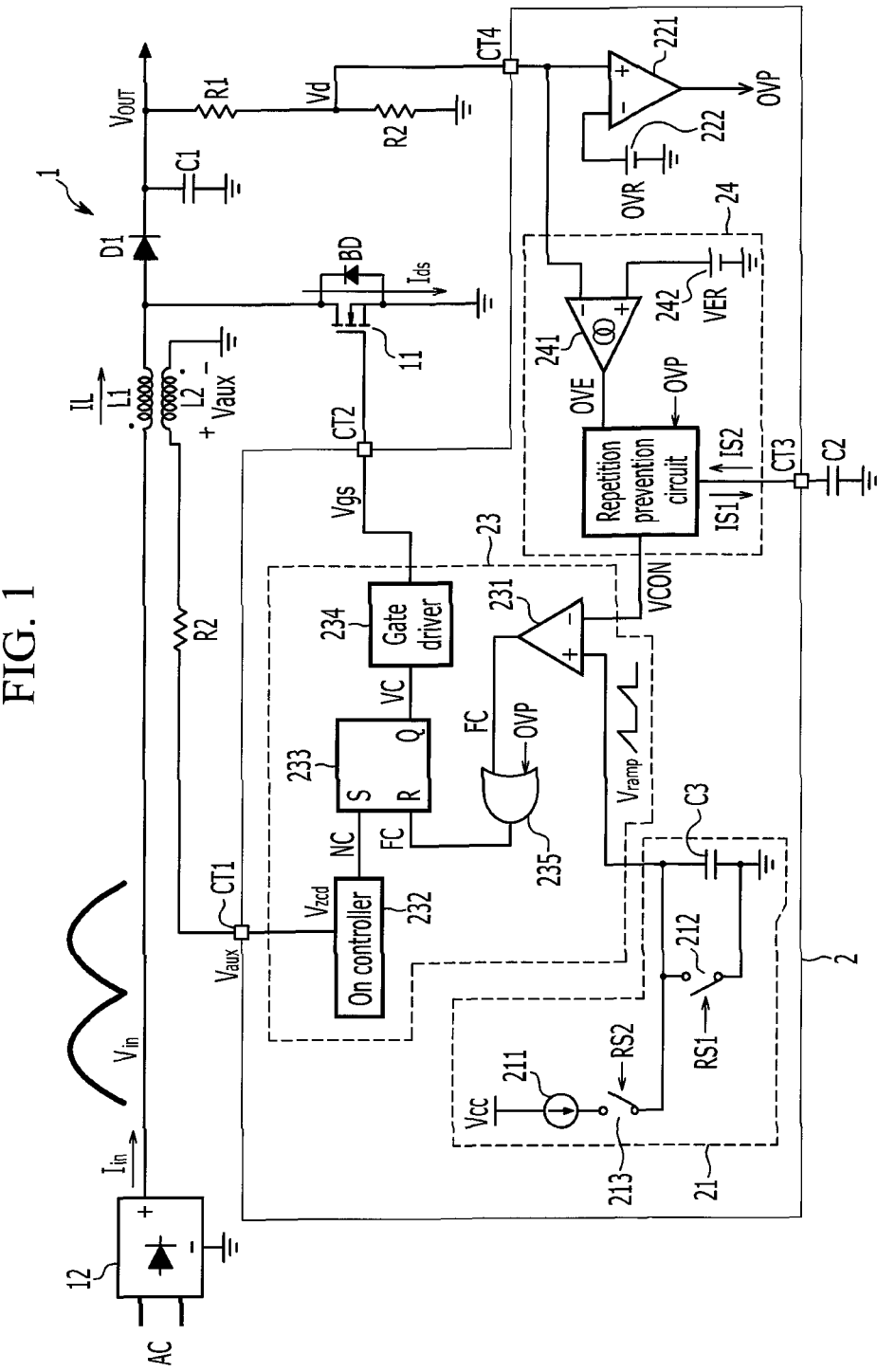
FIG. 1 is a view of an overvoltage repetition prevention circuit according to an exemplary embodiment of the present invention and a power factor circuit applied with the overvoltage repetition prevention method.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this specification and the claims that follow, when it is described that an element is "coupled" to another element, the element may be "directly coupled" to the other element or "electrically coupled" to the other element through a third element. In addition, unless explicitly described to the contrary, the word "comprise" and variations such as "comprises" or "comprising" will be understood to imply the inclusion of stated elements but not the exclusion of any other elements.

FIG. 1 is a view of an overvoltage repetition prevention circuit according to an exemplary embodiment of the present invention and a power factor correction circuit applied with the overvoltage repetition prevention method.

As shown in FIG. 1, a power factor correction circuit 1 includes a power factor correction controller 2, a power switch 11, a bridge diode 12, a diode D1, a capacitor C1, an inductor L1, an assistance inductor L2, and division resistors R1 and R2. The power switch 11 according to an exemplary embodiment of the present invention is made of a NMOSFET (n-channel metal oxide semiconductor field effect transistor). A body diode BD is formed between the drain and source electrodes of the power switch 11. A current flowing to the power switch 11 is referred to as "a drain current (Ids)".

The bridge diode 12 includes four diodes (not shown), and full-rectifies an input AC power source AC to generate an input voltage Vin.

One terminal of the inductor L1 is supplied with the input voltage Vin, and the other terminal of the inductor L1 is connected to an anode of the diode D1. An increasing and decreasing inductor current IL becomes an input current Iin of a sine wave that is full-rectified through the filter 13.

The drain electrode of the power switch 11 is connected to the anode of the diode D1 and the other terminal of the inductor L1.

The inductor L1 receives the input voltage Vin to generate the output power. The inductor current IL flowing to the inductor L1 is controlled by the switching operation of the power switch 11. The inductor current as the waveform of a triangle wave is repeatedly increased and decreased, and here, it is increased during a period in which the power switch 11 is turned-on, and it is decreased during a period in which the power switch 11 is turned-off.

In detail, during the period in which the power switch 11 is turned-on, while the inductor current IL is increased, the inductor L1 stores the energy. When the power switch 11 is turned-on, the diode D1 is nonconductive, and the inductor current IL flows through the power switch 11.

During the period in which the power switch 11 is turned-off, the diode D1 is conductive, the inductor current IL flows through the diode D1, and the energy stored to the inductor L1 is transmitted to the output terminal of the power factor correction circuit 1. The inductor current IL flows to a load connected to the output terminal of the power factor correction circuit 1 and charges the capacitor C1.

As the load connected to the output terminal of the power factor correction circuit 1 is increased, the inductor current IL supplied to the load is increased such that the current flowing to the capacitor C1 is relatively decreased, and thereby the output voltage Vout is relatively decreased. In contrast, if the load is decreased, the inductor current IL supplied to the load is decreased such that the current flowing to the capacitor C1 is relatively increased, and thereby the output voltage Vout is relatively increased.

The power factor correction controller 2 generates a control voltage VCON by using a divided voltage Vd that the output voltage Vout divided by a resistivity ratio R2/(R1+R2) is, and determines a turn-off time of the power switch 11 by comparing the control voltage VCON and a ramp signal Vramp having a predetermined cycle. A turn-on time of the power switch 11 is determined according to the voltage (hereinafter referred to as an assistance voltage Vaux) of the assistance inductor L2. The assistance inductor L2 is coupled to the inductor L1 with a predetermined turn ratio (a turn number of the assistance inductor L2/a turn number of the inductor L1). The voltage of which a turn ratio is multiplied by the voltage of both terminals of the inductor L1 is a voltage of both terminals of the assistance inductor L2, and the current of which the inductor current IL is divided by the turn ratio flows to the assistance inductor L2.

The overvoltage repetition prevention circuit 240 according to an exemplary embodiment of the present invention is included in the power factor correction controller 2. In detail, the overvoltage repetition prevention circuit 240 is formed at a constituent (hereinafter, a control voltage generator 24) generating a control voltage VCON of the power factor correction controller 2.

If the output voltage VOUT arrives at the overvoltage, the overvoltage repetition prevention circuit 240 changes the control structure of the power factor correction controller into a proportional control structure. That is, the control voltage generator 24 is controlled for the control voltage VCON to be generated according to the difference between the output voltage VOUT and the reference voltage VER. The reference voltage VER is a reference value corresponding to the output target voltage.

If the power factor correction circuit is started to be operated, the output voltage is increased and is stabilized as a predetermined output target voltage after a predetermined period has passed. The period in which the output voltage is stabilized is referred to as a normal state. In a conventional power factor correction circuit, the repetition of the overvoltage is generated by the increasing of the input voltage and the decreasing of the load in the normal state. Also, the overvoltage protection operation is repeatedly generated.

The overvoltage repetition prevention circuit 240 according to an exemplary embodiment of the present invention generates the control voltage VCON in the normal state according to a proportional-integral control structure, and generates the control voltage VCON according to the proportional control structure from the time that the overvoltage is generated.

According to the proportional-integral control structure, the operation of the power factor correction circuit is controlled according to a result that a normal state error as an error between the output voltage VOUT of the power factor correction circuit 1 and the output voltage target is integrated. In the normal state, the proportional-integral control structure is provided to prevent the change of the output voltage VOUT by the change of the AC input of the power factor correction circuit 1.

When the power factor correction circuit 1 depends on the proportional-integral structure in the normal state, the control voltage VCON is generated according to the integration result of the normal state error. Accordingly, a transition period is required until the control voltage VCON is changed according to the change of the output voltage VOUT.

After the time that the overvoltage is generated, if the control voltage VCON is generated according to the proportional-integral control structure, the overvoltage may be repeatedly generated during the transition period in which the control voltage VCON is changed according to the output voltage VOUT.

To prevent this, in an exemplary embodiment of the present invention, the overvoltage repetition prevention circuit 240 of the control voltage generator 24 controls the control voltage VCON for the control voltage VCON to be generated according to the proportional control structure from the time that the overvoltage is generated.

The description of the overvoltage repetition prevention circuit 240 will be given with reference to FIG. 2.

An exemplary embodiment of the present invention is a boundary conduction mode power factor correction circuit 1, thereby if the power switch 11 is turned off and the inductor current IL is 0, a resonance is generated between the inductor L1 and a parasitic capacitor (not shown) of the power switch 11. Thus, the voltage of the inductor L1 is decreased with the sine wave, and the assistance voltage Vaux is decreased. If the assistance voltage Vaux is started to be decreased, the power factor correction controller 2 senses the inductor current IL that is 0 and turns on the power switch 11 after a predetermined delay period. In detail, if the assistance voltage Vaux is started to be decreased and is decreased to a predetermined on reference voltage, the power switch 11 is turned on. Next, the power factor correction controller 2 will be described.

The power factor controller 2 includes a ramp signal generator 21, an overvoltage determiner 22, a PWM controller 23, and a control voltage generator 24.

The overvoltage determiner 22 determines the overvoltage by using the divided voltage Vd to generate an overvoltage protection signal OVP. The overvoltage determiner 22 includes a comparator 221 and a reference voltage source 222.

The inversion terminal (−) of the comparator 221 is input with the overvoltage reference voltage OVR generated from the reference voltage source 222, and the non-inversion terminal (+) of the comparator 221 is input with the divided voltage Vd. If the divided voltage Vd is more than the overvoltage reference voltage OVR, the comparator 221 determines the output voltage VOUT as the overvoltage.

When the overvoltage is generated, the control voltage generator 24 generates the control voltage VCON according to the proportional control method during the overvoltage stabilization period, and when the overvoltage is not generated, the control voltage VCON is generated according to the proportional-integral control method in the normal state.

In detail, the control voltage generator 24 amplifies the difference between the output reference voltage VER and the divided voltage Vd during the overvoltage stabilization period to generate the control voltage VCON according to the generated output voltage error OVE. In the normal state, the control voltage generator 24 generates the control voltage VCON according to the result of integrating the output voltage error OVE.

The control voltage generator 24 includes an overvoltage repetition prevention circuit 240, an error amplifier 248, and a reference voltage source 249. The error amplifier 248 according to an exemplary embodiment of the present invention is realized by a transconductance amplifier. However, the present invention is not limited thereto, and it may be a voltage error amplifier.

The error amplifier 248 includes the non-inversion terminal (+) input with the output reference voltage VER and the inversion terminal (−) input with the divided voltage Vd. The error amplifier 248 amplifies the difference between the output reference voltage VER as the input voltage of the non-inversion terminal (+) and the divided voltage Vd as the input voltage of the inversion terminal (−) to generate the output voltage error OVE. The output reference voltage VER is determined as the voltage corresponding to the output voltage target.

The output voltage error OVE according to an exemplary embodiment of the present invention is the current generated according to the difference between the output reference voltage VER and the divided voltage, and if the output voltage is larger than the output voltage target, the output voltage error OVE becomes a sink current IS2 flowing from the capacitor C2 to the error amplifier 24. If the output voltage is less than the output voltage target, the output voltage error OVE becomes a source current IS1 flowing from the error amplifier 24 to the capacitor C2. That is, if the divided voltage Vd is larger than the output reference voltage VER, the output voltage error OVE is the sink current IS2, and if the divided voltage Vd is less than the reference voltage VER, the output voltage error OVE is the source current IS1.

If the overvoltage is generated, the overvoltage repetition prevention circuit 240 controls the control voltage generator 24 such that the voltage corresponding to the output voltage error OVE becomes the control voltage VCON during the overvoltage stabilization period. The overvoltage repetition prevention circuit 240 is triggered when the overvoltage is generated such that the operation is started. In the normal state, the capacitor C2 is directly connected to the output terminal of the error amplifier 248 such that the output voltage error OVE is frequency-compensated by the capacitor C2. The frequency compensation means to set up the gain of the specific frequency band higher than the frequency of the other frequency band. If the capacitor C2 is connected to the output terminal of the error amplifier 248, frequency compensation in which only the low frequency component of the output voltage error OVE is passed is generated. Thus, the output voltage error OVE is integrated such that the control voltage VCON is generated. This method is one example according to the above-described proportional-integral control structure.

The overvoltage repetition prevention circuit 240 is triggered when the overvoltage is generated, and thereby the control voltage VCON is generated without the frequency compensation of the output voltage error OVE during the overvoltage stabilization period. This method is one example according to the above-described proportional control structure.

Next, the overvoltage repetition prevention circuit 240 according to an exemplary embodiment of the present invention will be described with reference to FIG. 2.

Figure 2:
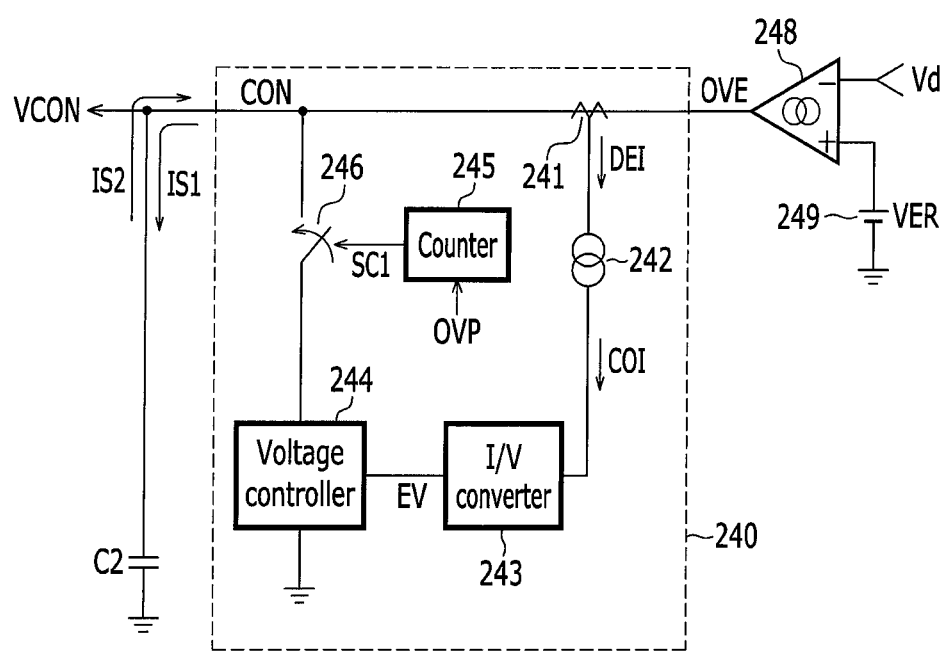
FIG. 2 is a view of an overvoltage repetition prevention circuit 240 according to an exemplary embodiment of the present invention.

FIG. 2 is a view of an overvoltage repetition prevention circuit according to an exemplary embodiment of the present invention.

As shown in FIG. 2, the overvoltage repetition prevention circuit 240 includes a current detector 241, a current mirror circuit 242, an I/V convertor 243, a control voltage compensator 244, a counter 245, and a control switch 246.

The current detector 241 senses the output voltage error OVE to generate a detection current DEI corresponding to the output voltage error OVE.

The current mirror circuit 242 copies the detection current DEI with a predetermined ratio to generate the copy current COI, and the copy current COI is transmitted to the I/V convertor 243.

The I/V convertor 243 converts the copy current COI into the voltage to generate an error voltage EV.

The counter 245 generates a switch signal SC1 for turning on the control switch 246 during the overvoltage stabilization period in synchronization with the time that the overvoltage protection signal OVP is generated, and the switch signal SC2 turning off the control switch 246 in the normal state. The counter 245 according to an exemplary embodiment of the present invention may turn on the control switch 246 after a predetermined time from the time that the overvoltage protection operation is started. The control switch 246 is connected between the output terminal CON of the control voltage generator 24 and the control voltage controller 244. If the control switch 246 is turned on, the control voltage controller 244 and the output terminal CON of the capacitor C2 and the control voltage generator 24 are connected, and the control voltage VCON is determined by the operation of the control voltage controller 244. If the control switch 246 is turned off, the voltage of which the output voltage error OVE is frequency compensated by the capacitor C2 becomes the control voltage VCON.

The control voltage controller 244 controls the control voltage as a value following to the error voltage EV during the overvoltage stabilization period. In detail, the control voltage controller 244 is connected to the capacitor C2 and the output terminal CON of the control voltage generator 24 during the period in which the control switch 246 is turned on. Thus, the control voltage controller 244 regulates the voltage of the capacitor C2 as the same voltage as the error voltage EV, and the control voltage VCON is determined as the same voltage as the error voltage EV. The error voltage EV is the voltage determined according to the output voltage error OVE, and resultantly, the control voltage VCON is generated according to the proportional control structure determined as the value in proportion to the output voltage error OVE.

The capacitor C2 has one terminal connected to one terminal of the control switch 246 and the output terminal of the error amplifier 248 and the other terminal that is grounded. When the control switch 246 is turned-off, the capacitor C2 is charged or discharged according to the output voltage error OVE, and the control voltage VCON is determined according to the voltage of one terminal of the capacitor C2. When the output voltage error OVE is the source current, the capacitor C2 is charged, and when the output voltage error OVE is the sink current, the capacitor C2 is discharged. If the switch S1 is turned-on, the output voltage of the control voltage controller 244 becomes the voltage of the capacitor C2.

The overvoltage stabilization period is set up from the time that the overvoltage is generated to the time that the control voltage is stabilized. When the load connected to the power factor correction circuit is changed from a heavy load to a light load, or the input voltage of the power factor correction circuit is abruptly changed from the low voltage to the high voltage, the overvoltage is generated. Here, according to the proportion integration control method, the control voltage is maintained as the high voltage during the period such that the overvoltage protection operation is repeatedly generated.

To prevent this, the exemplary embodiment of the present invention quickly changes the control voltage during the overvoltage stabilization period such that the control voltage is appropriate for the current load and the input voltage state according to the proportional control method.

Again referring to FIG. 1, the constitution of the power factor correction controller 2 will be described.

The ramp signal generator 21 generates the ramp signal Vramp that is increased while having a predetermined slope during the period in which the power switch 11 is turned on. The ramp signal generator 21 includes a constant current source 211, a discharging switch 212, a charging switch 213, and a capacitor C3. One terminal of the constant current source 211 is connected to one terminal of the charging switch 213, and the other terminal of the charging switch 213 is connected to the discharging switch 212 and one terminal of the capacitor C3. The discharging switch 212 and the capacitor C3 are connected in parallel, and the discharging switch 212 and the other terminal of the capacitor C3 are grounded. The charging switch 213 is turned on by the switching signal RS2 during the period in which the power switch 11 is turned on, and the switch 212 is turned off by the switching signal RS1. Thus, the current of the constant current source 211 charges the capacitor C3, and thereby the ramp signal Vramp is increased with the slope for flowing the current of the constant current source 211. During the period in which the power switch 11 is turned off, the charging switch 213 is turned off by the switching signal RS2 and the switch 212 is turned on by the switching signal RS1. Thus, the current of the constant current source 211 is blocked and the capacitor C3 is discharged, and thereby the ramp signal Vramp is quickly discharged and then becomes the ground voltage.

The PWM controller 23 generates a gate control signal Vgs to control the switching operation of the power switch 11 by using an assistance voltage Vaux, a ramp signal Vramp, an overvoltage protection signal OVP, and the control voltage VCON. The PWM controller 23 includes a PWM comparator 231, an on controller 232, a PWM flip-flop 233, a gate driver 234, and an OR gate 235.

The PWM comparator 231 compares the ramp signal Vramp and the control voltage VCON to generate a comparison signal CC. The PWM comparator 231 includes the non-inversion terminal (+) input with the ramp signal Vramp and the inversion terminal (−) input with the control voltage VCON. If the ramp signal Vramp is more than the control voltage VCON, the PWM comparator 231 generates the comparison signal CC of the high level, and if the ramp signal Vramp is less than the control voltage VCON, the comparison signal CC of the low level is generated. Accordingly, if the ramp signal Vramp that is increased arrives at the control voltage VCON, the comparison signal CC of the high level is output at that time.

The OR gate 235 receives the comparison signal CC and the overvoltage protection signal OVP and executes a logic sum calculation to generate an off control signal FC. In the normal state, the overvoltage protection signal OVP is the low level such that the level of the off control signal FC is determined according to the comparison signal CC. If the output voltage becomes the overvoltage such that the overvoltage protection signal OVP becomes the high level, the off control signal FC becomes the high level of the overvoltage protection signal OVP.

The on controller 232 generates the on control signal NC to turn on the power switch 11 according to the assistance voltage Vaux. The on controller 232 generates the on control signal NC having the pulse of the high level in synchronization with the on control time at which the assistance voltage Vaux that is decreased after the power switch 11 is turned off becomes less than a predetermined on reference voltage.

The PWM flip-flop 233 generates a gate driver control signal VC to control the switching operation of the power switch 11 according to the on control signal NC and the off control signal FC. The PWM flip-flop 233 includes a set terminal S input with the on control signal NC and a reset terminal R input with the off control signal FC. If the signal of the high level is input to the set terminal S, the PWM flip-flop 233 outputs the gate driver control signal VC of the high level through the output terminal Q. If the signal of the high level is input to the reset terminal R, the PWM flip-flop 233 outputs the gate driver control signal VC of the low level through the output terminal Q. If the signals input to the set terminal S and the reset terminal R are all the low level, the PWM flip-flop 233 maintains the current gate driver control signal VC as it is.

The gate driver 234 generates the gate signal Vgs switching the power switch 11 according to the gate driver control signal VC. If the gate driver control signal VC of the high level is input, the gate driver 234 generates the gate signal Vgs of the high level for turning on the power switch 11, and if the gate driver control signal VC of the low level is input, it generates the gate signal Vgs of the low level for turning off the power switch 11.

Figure 3:
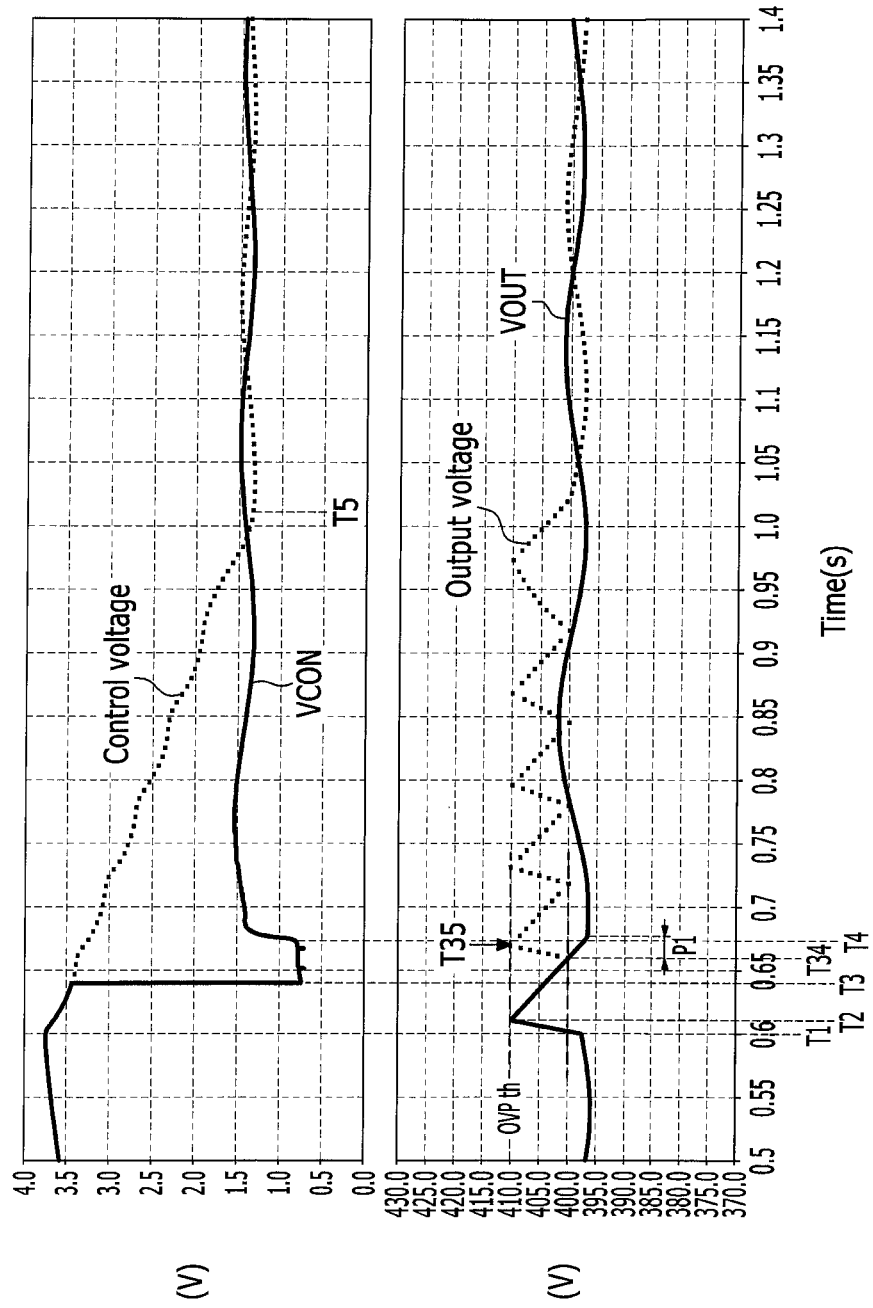
FIG. 3 is a waveform diagram of a control voltage during an overvoltage stabilization period according to an exemplary embodiment of the present invention.

FIG. 3 is a waveform diagram of a control voltage during an overvoltage stabilization period according to an exemplary embodiment of the present invention.

As shown in FIG. 3, it is assumed that the load is quickly decreased at the time T1 or the input voltage is quickly increased such that the overvoltage is generated at the time T2. The output voltage VOUT arrives at the overvoltage threshold voltage OVP at the time T2 by the change that is generated at the time T1. Thus, the overvoltage protection signal OVP is generated at the time T2, the power switch 11 stops the switching operation, and the output voltage VOUT starts to decrease.

The overvoltage repetition prevention circuit 240 according to an exemplary embodiment of the present invention is triggered by the overvoltage protection signal OVP, and here, it is assumed that it is triggered at the time T3 that is delayed by a predetermined time after the overvoltage protection operation is started.

The control switch 246 is turned on at the time T3 such that the control voltage generator 24 and the output terminal CON are connected. Thus, the control voltage VCON starts to quickly decrease from the time T3 according to the error voltage EV. The output voltage VOUT is the overvoltage such that the divided voltage Vd is also the high voltage and becomes the higher voltage than the output reference voltage VER. Accordingly, the output voltage error OVE is the sink current IS2, and the error voltage EV generated according to the sink current IS2 becomes the low value. Accordingly, the control voltage VCON is changed into the voltage following the error voltage EV at the time T3.

The control voltage VCON is maintained as the voltage following the error voltage EV by the control voltage controller 244 from the time T3 to the time T4. If the overvoltage stabilization period is finished at the time T4, the control switch 246 is turned off.

Thus, the control voltage VCON is generated as the voltage of which the output voltage error OVE is frequency compensated by the capacitor C2 from the time T4.

In FIG. 3, the period in which the control voltage VCON is stabilized from the time T3 to the time T4 is the overvoltage stabilization period.

The overvoltage protection is triggered at the time T2, the control switch 246 is turned on at the time T3. Thus, the control voltage VCON decreases from the time T3 and is maintained as the voltage following the error voltage EV by the control voltage controller 244 during the overvoltage stabilization period. The overvoltage stabilization period is finished at the time T4, the control switch 246 is turned off, and the control voltage VCON is increased by the frequency compensation.

The overvoltage stabilization period may be set up as a constant value by the counter 245. Here, the overvoltage stabilization period may be maintained by an experimental method according to a design condition of the power factor correction circuit 1. That is, when the input voltage is quickly increased or the load is quickly decreased, the control voltage VCON is generated according to the proportional control structure such that the shortest period in which the overvoltage is not repeated is detected, and at least the shortest period may be set up as the overvoltage stabilization period.

The control voltage indicated by a dotted line in FIG. 3 represents the control voltage of the power factor correction circuit without the overvoltage repetition prevention circuit according to an exemplary embodiment of the present invention. As shown in FIG. 3, when the control voltage VCON is determined according to the output voltage error OVE at the time T3 and is quickly decreased, the overvoltage protection operation is finished and the switching operation of the power switch is again started such that the overvoltage is not generated although the output voltage is increased.

For example, it may be seen that the overvoltage protection operation is finished at the time T34 such that the output voltage is not increased and the control voltage VCON is very low in the case that the switching operation of the power switch is again started, and thereby the output voltage is decreased in a predetermined period P1. Accordingly, the overvoltage is not repeated.

However, according to the control voltage indicated by the dotted line of FIG. 3, the control voltage is also the very high voltage at the time T34. Accordingly, the switching operation of the power switch is controlled in the direction of increasing the output voltage. The output voltage shown by the dotted line in FIG. 3 is increased from the time T34. Thereafter, the output voltage shown by the dotted line at the time T35 again becomes the overvoltage.

According to a conventional method, the overvoltage protection operation is further generated five times to the time T5 required for the reaction of the control voltage to the change of the input voltage and the change of the load.

An exemplary embodiment of the present invention may control the control voltage VCON for the overvoltage protection operation repetition to be prevented.

In an exemplary embodiment of the present invention, the error amplifier 241 is a transconductance amplifier, however it may be a voltage amplifier. Here, the capacitor C2 is connected to the inversion terminal and the output terminal of the error amplifier for the frequency compensation, and the current detector, the current copy unit, and the I/V convertor are not needed. At this time, the control voltage VCON in proportion to the output voltage error that is the output of the error amplifier 241 is generated.

Until now, as one example that is applied with the overvoltage repetition prevention circuit according to an exemplary embodiment of the present invention, the power factor correction circuit has been described. However, the present invention is not limited thereto, and the overvoltage repetition prevention circuit and the method of the present invention may also be applied to a system in which the control response according to the change of the output voltage is slow.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

<DESCRIPTION OF SYMBOLS> power factor correction circuit 1
power factor correction controller 2, power switch 11
bridge diode 12, diode D1, capacitor C1-C3), inductor L1
assistance inductor L2, division resistor R1 and R2
ramp signal generator 21
overvoltage determiner 22, PWM controller 23
control voltage generator 24
overvoltage repetition prevention circuit 240
error amplifier 248, reference voltage 249
current detector 241, current mirror circuit 242, I/V converter 243
control voltage compensator 244
compensation period controller 245, control switch 246
constant current 211, discharging switch 212, charging switch 213

What is claimed is:

1. A power factor correction circuit comprising:
an inductor receiving an input voltage and supplying an inductor current;
a power switch connected to the inductor and controlling the inductor current; and
a power factor correction controller generating a control voltage for controlling a switching operation of the power switch according to a first control structure during a predetermined overvoltage stabilization period generated in synchronization with a time that an output voltage becomes an overvoltage and according to a second control structure that is different from the first control structure during a normal state in which the output voltage is not the overvoltage,
wherein the power factor correction controller determines a control structure for generating the control voltage according to a difference between the output voltage and a predetermined output target voltage.

2. The power factor correction circuit of claim 1, wherein the power factor correction controller generates the control voltage to be proportional to an output voltage error that is a difference between a divided voltage corresponding to the output voltage and an output reference voltage corresponding to the output target voltage that is a target voltage of the output voltage during the overvoltage stabilization period.

3. The power factor correction circuit of claim 2, wherein the second control structure is a proportional-integral structure generating the control voltage according to a result of integrating the output voltage during the normal state.

4. The power factor correction circuit of claim 2, wherein the power factor correction controller includes:

a control voltage generator generating the control voltage according to the output voltage error; and
a capacitor connected to the output terminal of the control voltage generator and compensating a frequency component of the control voltage.

5. The power factor correction circuit of claim 4, wherein the control voltage generator includes:
an error amplifier amplifying a difference between the divided voltage and the output reference voltage to generate the output voltage error; and
an overvoltage repetition prevention circuit generating the control voltage determined by an error voltage corresponding to the output voltage error during the overvoltage stabilization period,
wherein the overvoltage repetition prevention circuit is triggered when the overvoltage is generated.

6. The power factor correction circuit of claim 5, wherein the overvoltage repetition prevention circuit includes:
a current detector sensing an output voltage error to generate a detection current corresponding to the output voltage error;
a current mirror circuit copying the detection current with a predetermined ratio to generate a copy current;
an I/V convertor converting the copy current into a voltage to generate the error voltage;
a control voltage controller connected to the output terminal of the control voltage generator during the overvoltage stabilization period to control the control voltage as a value following the error voltage;
a control switch connected between the output terminal of the control voltage generator and the control voltage controller; and
a counter triggered by the overvoltage protection signal generated when the overvoltage is generated such that the control switch is turned on during the overvoltage stabilization period.

7. The power factor correction circuit of claim 1, further comprising an assistance inductor coupled to the inductor in a predetermined turn ratio,
wherein the power factor correction controller determines a turn-on time of the power switch according to an assistance voltage as the voltage of both terminals of the assistance inductor and determines a turn-off time of the power switch according to a result of comparing the control voltage with a ramp signal having a predetermined cycle.

8. The power factor correction circuit of claim 1, wherein the first control structure is a proportional control structure and when the control voltage is generated according to the proportional control structure during a predetermined first period so that generation of the overvoltage is prevented after the overvoltage is generated corresponding to a change of a load connected to the power factor correction circuit or a change of the input voltage of the power factor correction circuit, the overvoltage stabilization period is set up as at least the first period.

9. An overvoltage repetition prevention circuit of an output voltage of a circuit including a capacitor supplied with a control voltage controlling a switching operation of a power switch, comprising:
an I/V convertor generating an error voltage following an output voltage error that is a difference between a divided voltage corresponding to the output voltage during a predetermined overvoltage stabilization period and an output reference voltage corresponding to an output target voltage that is a target voltage of the output voltage; and
a control voltage controller controlling the control voltage as a value following the error voltage according to a proportional control structure during the overvoltage stabilization period.

10. The overvoltage repetition prevention circuit of claim 9, wherein the overvoltage repetition prevention circuit further includes:
a control switch connected between one terminal of a capacitor applied with the control voltage and the control voltage controller; and
a counter triggered by the overvoltage protection signal generated when the overvoltage is generated to turn on the control switch during the overvoltage stabilization period.

11. The overvoltage repetition prevention circuit of claim 9, wherein the overvoltage repetition prevention circuit further includes:
a current detector sensing the output voltage error to generate a detection current corresponding to the output voltage error; and
a current mirror circuit copying the detection current with a predetermined ratio to generate a copy current, and
the I/V convertor converts the copy current into a voltage to generate the error voltage.

12. The overvoltage repetition prevention circuit of claim 9, wherein after the overvoltage is generated corresponding to a change of a load connected to the circuit or a change of an input voltage of the circuit, the control voltage is generated according to the proportional control structure during a predetermined first period such that the overvoltage is not generated, and
the overvoltage stabilization period is set up as at least the first period.

13. An overvoltage repetition prevention method of an output voltage of a circuit including a capacitor supplied with a control voltage controlling a switching operation of a power switch, comprising:
generating an error voltage following an output voltage error that is a difference between a divided voltage corresponding to the output voltage during a predetermined overvoltage stabilization period and an output reference voltage corresponding to an output target voltage that is a target voltage of the output voltage; and
controlling the control voltage as a value following the error voltage according to a proportional control structure during the overvoltage stabilization period.

14. The overvoltage repetition prevention method of claim 13, wherein after the overvoltage is generated corresponding to a change of a load connected to the circuit or a change of an input voltage of the circuit, the control voltage is generated according to the proportional control structure during a predetermined first period such that the overvoltage is not generated, and
the overvoltage stabilization period is set up as at least the first period.

* * * * *